(12) United States Patent
Lees et al.

(10) Patent No.: US 10,719,286 B2
(45) Date of Patent: Jul. 21, 2020

(54) MECHANISM TO PRESENT IN AN ATOMIC MANNER A SINGLE BUFFER THAT COVERS MULTIPLE DISPLAYS

(71) Applicant: Microsoft Technology Licensing, LLC, Redmond, WA (US)

(72) Inventors: Steven Lees, Seattle, WA (US); Lukasz Konrad Brodzinski, Seattle, WA (US); Kiran Muthabatulla, Sammamish, WA (US); Marcus John Andrews, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/988,627

(22) Filed: May 24, 2018

(65) Prior Publication Data

US 2019/0303084 A1    Oct. 3, 2019

Related U.S. Application Data

(60) Provisional application No. 62/650,016, filed on Mar. 29, 2018.

(51) Int. Cl.
*G09G 5/00* (2006.01)
*G06F 3/14* (2006.01)
(Continued)

(52) U.S. Cl.
CPC .............. *G06F 3/1446* (2013.01); *G06T 1/60* (2013.01); *G06T 11/001* (2013.01); *G09G 5/12* (2013.01);
(Continued)

(58) Field of Classification Search
CPC .... G06F 3/1423; G06F 1/1616; G06F 1/1647; G06F 2203/04803; G06F 3/1454; G09G 2300/023; G09G 3/2092
See application file for complete search history.

(56) References Cited

U.S. PATENT DOCUMENTS 5,963,200 A    10/1999  Deering et al.
2010/0060664 A1*   3/2010  Kilpatrick, II ........ G06F 1/1616
                                                            345/650

(Continued)

OTHER PUBLICATIONS

"International Search Report and Written Opinion Issued in PCT Application No. PCT/US2019/023496", dated May 14, 2019, 18 Pages.

*Primary Examiner* — Hau H Nguyen
(74) *Attorney, Agent, or Firm* — Ray Quinney & Nebeker; Tiffany Healy (57) ABSTRACT

Methods and devices for presenting an image in an atomic manner across a plurality of displays of a computer device from a single buffer shared by the plurality of displays may include synchronizing the plurality of displays of the computer device. The methods and devices may initiate an atomic present request to present an image frame on the plurality of displays including a first display and a second display, the atomic present request may identify at least a first display texture and a second display texture from a plurality of display textures stored in the single buffer corresponding to the image frame and that the first display texture corresponds to a first display and the second display texture corresponds to a second display. The devices and methods may transmit a bundled set of first image frame data and second image frame data from the single buffer to a display driver.

22 Claims, 5 Drawing Sheets (51) Int. Cl.
*G06T 1/60* (2006.01)
*G06T 11/00* (2006.01)
*G09G 5/12* (2006.01)
*G09G 5/14* (2006.01)
*G09G 5/377* (2006.01)

(52) U.S. Cl.
CPC .............. *G09G 5/14* (2013.01); *G09G 5/377* (2013.01); *G09G 2300/026* (2013.01); *G09G 2356/00* (2013.01); *G09G 2360/04* (2013.01); *G09G 2360/18* (2013.01); *G09G 2370/042* (2013.01)

(56) References Cited

U.S. PATENT DOCUMENTS

2014/0247197 A1* 9/2014 Margulis ................. G06F 1/266
  345/2.3
2015/0356045 A1 12/2015 Soffer
2016/0165176 A1* 6/2016 Hundemer ........... H04N 5/9305
  386/230

* cited by examiner

MECHANISM TO PRESENT IN AN ATOMIC MANNER A SINGLE BUFFER THAT COVERS MULTIPLE DISPLAYS

RELATED APPLICATION

This application claims priority to U.S. Application No. 62/650,016 titled "Mechanism to Present in an Atomic Manner a Single Buffer That Covers Multiple Displays," filed Mar. 29, 2018, which is incorporated herein by reference in its entirety.

BACKGROUND

The present disclosure relates to displaying display textures over multiple displays.

Normally, each display attached to a computing device has a texture buffer associated with the display. An operating system which wants to present content on an attached display, writes content into these buffers to be scanned out to the display. The act of scan out constitutes the buffer being translated from a texture into a physical emission of light that can be observed on the display. In multiple display configurations, it is often the case that each display does not begin to "scan out" its buffer at the same time. This can cause the user to observe artifacts when the content in each buffer is meant to be visible at the same time, such as a precise animation. This can be addressed by "gen locking" the displays such that each display starts its scan out at the same time. Yet, this technique still leaves room for improvement.

Thus, there is a need in the art for improvements in presenting display textures over multiple displays.

SUMMARY

The following presents a simplified summary of one or more implementations of the present disclosure in order to provide a basic understanding of such implementations. This summary is not an extensive overview of all contemplated implementations, and is intended to neither identify key or critical elements of all implementations nor delineate the scope of any or all implementations. Its sole purpose is to present some concepts of one or more implementations of the present disclosure in a simplified form as a prelude to the more detailed description that is presented later.

One example implementation relates to a computer device. The computer device may include a plurality of displays; a memory to store data and instructions, wherein the memory stores a single buffer shared by the plurality of displays with a plurality of display textures corresponding to an image frame to present on the plurality of displays, a processor in communication with the memory, an operating system in communication with the memory and the processor. The operating system may be operable to synchronize the plurality of displays of the computer device; initiate an atomic present request to present the image frame on the plurality of displays including at least a first display and a second display, the atomic present request identifying at least a first display texture and a second display texture from the plurality of display textures corresponding to the image frame and that the first display texture corresponds to the first display and the second display texture corresponds to the second display; and transmit a bundled set of first image frame data and second image frame data from the single buffer to a display driver, wherein the first image frame data comprises the first display texture corresponding to the first display, and wherein the second image frame data comprises the second display texture corresponding to the second display.

Another example implementation relates to a method for presenting an image in an atomic manner across a plurality of displays of a computer device from a single buffer shared by the plurality of displays. The method may include synchronizing, at an operating system executing on the computer device, the plurality of displays of the computer device. The method may include initiating an atomic present request to present an image frame on the plurality of displays including at least a first display and a second display, the atomic present request identifying at least a first display texture and a second display texture from a plurality of display textures stored in the single buffer corresponding to the image frame and that the first display texture corresponds to the first display and the second display texture corresponds to the second display. The method may include transmitting a bundled set of first image frame data and second image frame data from the single buffer to a display driver, wherein the first image frame data comprises the first display texture corresponding to the first display, and wherein the second image frame data comprises the second display texture corresponding to the second display.

Another example implementation relates to computer-readable medium storing instructions executable by a computer device. The computer-readable medium may include at least one instruction for causing the computer device to synchronize a plurality of displays of the computer device. The computer-readable medium may include at least one instruction for causing the computer device to initiate an atomic present request to present an image frame on the plurality of displays including at least a first display and a second display, the atomic present request identifying at least a first display texture and a second display texture from a plurality of display textures stored in a single buffer shared by the plurality of displays corresponding to the image frame and that the first display texture corresponds to the first display and the second display texture corresponds to the second display. The computer-readable medium may include at least one instruction for causing the computer device to transmit a bundled set of first image frame data and second image frame data from the single buffer to a display driver, wherein the first image frame data comprises the first display texture corresponding to the first display, and wherein the second image frame data comprises the second display texture corresponding to the second display.

Additional advantages and novel features relating to implementations of the present disclosure will be set forth in part in the description that follows, and in part will become more apparent to those skilled in the art upon examination of the following or upon learning by practice thereof.

DETAILED DESCRIPTION

This disclosure relates to devices and methods for presenting in an atomic manner a single buffer across multiple displays. An atomic present across multiple displays may allow for all the effects of the image to be observed in a single frame, whereas a non-atomic present some effects may be observed in one frame while others may be observed in the following frame. As such, when presenting in an atomic manner, either all the effects are observed in a frame or all the effects are deferred to the following frame. The methods and devices may use a single buffer to bundle together display textures to present across multiple displays so that the display textures may be synchronized when presented across multiple displays. By using a single buffer to present display textures across multiple displays, temporal misalignments of the display textures may be prevented by presenting the images at the same time on the different displays.

The devices and methods may allow the ability to seamlessly switch between presenting a single buffer for all displays and unique buffers for each display in communication with the computer device. In addition, the devices and methods enable the use of hardware composition during presentation. Hardware composition may allow for multiple elements of an image to be combined as they are displayed without the generation of a texture containing the complete image.

Figure 1:
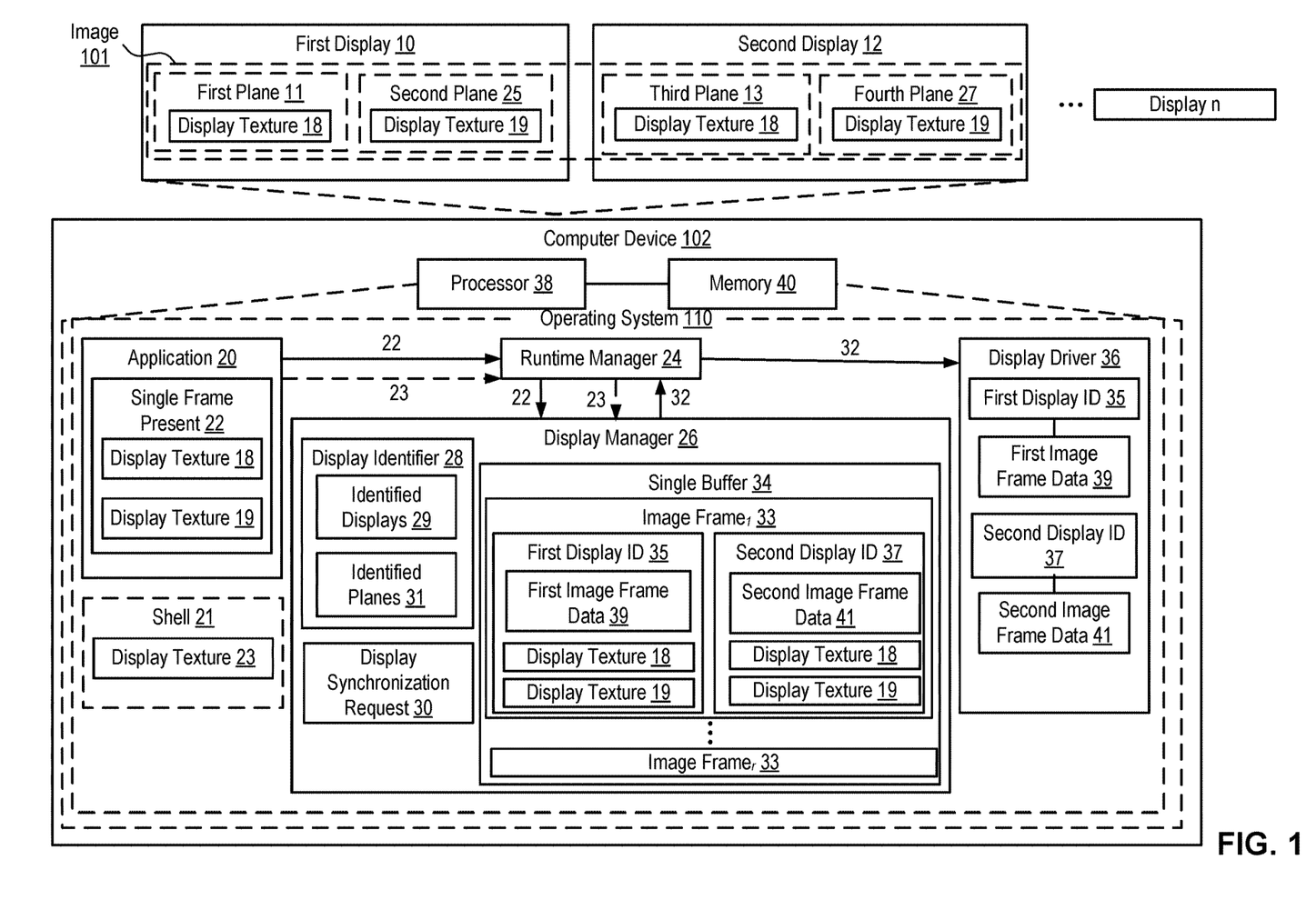
FIG. 1 is a schematic block diagram of an example computer device in accordance with an implementation of the present disclosure.
Figure 2:
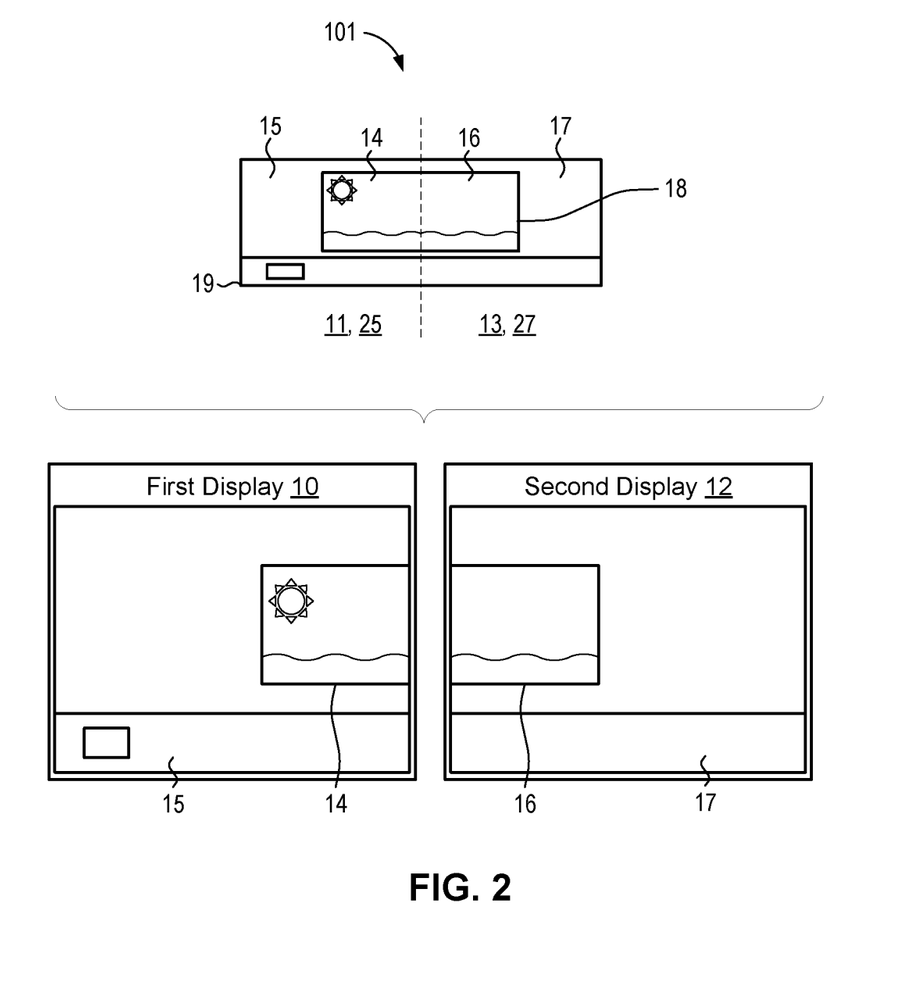
FIG. 2 is an example of an image presented across two displays in an atomic manner from a single buffer in accordance with an implementation of the present disclosure.

Referring to FIGS. 1 and 2, a computer device 102 for use with presenting an image 101 in an atomic manner from a single buffer 34 across multiple displays in communication with computer device 102 so that the image may be presented in synchronization across multiple displays. Computer device 102 may include and/or may be in communication with a plurality of displays up to n displays (where n is an integer). For example, computer device 102 may include a first display 10 and a second display 12.

The image 101 may be defined by one or more display textures, which may be, for example, different images that make up the whole image, different parts of the image, different layers (e.g., background, foreground), different objects in the image, or any combination thereof. As such, all or part of one or more display textures that define the image 101 may be presented across the multiple displays. Moreover, each display texture may be generated by one or more applications (e.g., a foreground texture), and/or by the operating system (e.g., a background texture).

In some optional implementations, dividing one or more textures across multiple displays may be performed by identifying display planes. For instance, each image 101 may be partitioned into one or more display planes, e.g., up to m planes (where m is an integer), for presenting one or more display textures. Each display plane may have a display texture associated with the display plane. A display texture may be associated with more than one display plane. Each display plane may be a region or subset of a display area for displaying the image 101, where the display area may be divided up between multiple displays. As such, multiple display planes may be associated with each of the multiple displays. Each display plane may be associated with one of the multiple displays, and the display planes are synchronized to enable the multiple displays to display a different portion of the image 101.

For example, the first display 10 may be associated with a first plane 11 that presents a display texture of the image 101 and a second plane 25 that presents a display texture of the image 101. In addition, the second display 12 may be associated with a third plane 13 that presents a corresponding display texture of the image 101 and a fourth plane 27 that presents a corresponding display texture of the image 101. For example, the first plane 11 associated with the first display 10 may include a first portion 14 of a first display texture 18, e.g., a left portion of an overlay image, and the second plane 25 associated with the first display 10 may include a first portion 15 of a second display texture 19, e.g., a left portion of a background image. In addition, the third plane 13 associated with the second display 12 may include a second portion 16 of the first display texture 18, e.g., a right portion of the overlay image, and the fourth plane 27 associated with the second display 12 may include a second portion 17 of the second display texture 19, e.g., a right portion of a background image. As such, a combination of display textures may be displayed in synchronization on the first display 10 and the second display 12 by using a combination of planes 11, 13, 25, 27 to present the image 101.

Computer device 102 may include an operating system 110 executed by processor 38 and/or system memory 40 of computer device 102. System memory 40 may be configured for storing data and/or computer-executable instructions defining and/or associated with operating system 110, and processor 38 may execute operating system 110. An example of system memory 40 can include, but is not limited to, a type of memory usable by a computer, such as random access memory (RAM), read only memory (ROM), tapes, magnetic discs, optical discs, volatile memory, non-volatile memory, and any combination thereof. An example of processor 38 can include, but is not limited to, any processor specially programmed as described herein, including a controller, microcontroller, application specific integrated circuit (ASIC), field programmable gate array (FPGA), system on chip (SoC), or other programmable logic or state machine. Computer device 102 may include any mobile or fixed computer device, which may be connectable to a network. Computer device 102 may be, for example, a computer device such as a desktop or laptop or tablet computer, a server computer, a cellular telephone, a gaming device, a mixed reality or virtual reality device, a music device, a television, a navigation system, a camera, a personal digital assistant (PDA), or a handheld device, or any other computer device having wired and/or wireless connection capability with one or more other devices.

Operating system 110 may include one or more, e.g., up top (wherep is an integer), applications 20 executed by processor 38 and/or system memory 40 of computer device 102. Applications 20 may generate and/or initiate the presentation of one or more display textures 18, 19 to display all or parts of an image frame that defines a given presentation of the image 101. A display texture may be a memory area containing pixel information for a two-dimensional image. In addition, a display texture may optionally include information describing how pixels from multiple textures may be combined. For example, application 20 may generate and/or initiate a single frame present 22 that identifies and/or that includes the display textures 18, 19 that application 20 wants to present in an image frame. Application 20 may transmit the single frame present 22 to a runtime manager 24. In an implementation, a shell 21 may also want to present one or more display textures 23, such as a background image or other images. Shell 21 may transmit any display textures 23 to present to runtime manager 24.

Runtime manager 24 may coordinate the communications between applications 20, shell 21, and/or one or more display drivers 36 on computer device 102 so that the display textures 18, 19, 23 generated and/or initiated by applications 20 and/or shell 21 may be presented on the displays in communication with computer device 102.

Runtime manager 24 may also communicate with a display manager 26 that composes the frames for rendering by the graphics processing unit (GPU) for display. For example, display manager 26 may receive the single frame present 22 from each application 20 that wants to draw an image frame including display textures (e.g., display textures 18 and 19). In addition, display manager 26 may receive display textures 23 from shell 21, which may be associated with the display textures from the application 20. Display manager 26 may wait to receive the single frame present 22 from each application 20 and/or shell 21 that wants to draw display textures before arranging the correct layering and composition of the image frames for the received display textures (e.g., display textures 18, 19, and 23) to be sent to the GPU for rendering into a single image frame to transmit to the displays.

Display manager 26 may include a display identifier 28 that identifies a number of displays 29 in communication with computer device 102. For example, the identified displays 29 may include two displays, the first display 10 and the second display 12, in communication with computer device 102.

Display identifier 28 may also identify one or more planes 31 associated with each image frame and with each of the identified displays 29 that may be used to present the display textures of the image 101. For example, the identified planes 31 may include a first plane 11 for the first display 10, second plane 25 for the first display 10, a third plane 13 for the second display 12, and fourth plane 27 for the second display 12.

Display identifier 28 may also indicate whether the identified displays 29 may be synchronized. Displays may be synchronized, for example, when the displays have the same resolutions and the same timing. When the identified displays 29 are to be synchronized, display manager 26 may send a display synchronization request 30 to synchronize the signals and/or the timing of the identified displays 29.

Once the identified displays 29 are synchronized, display manager 26 may determine where to display the received display textures, e.g., display textures 18, 19, from applications 20 for image 101 and/or texture 23 from shell 21. Shell 21 may maintain data structures which describe where each user interface (UI) element fits within a coordinate system and may also define the translation of the elements within the coordinate system to the displays. For example, display manager 26 may determine to present different portions of display textures 18, 19, and 23 across both the first display 10 and the second display 12. Another example may include display manager 26 determining to present at least one of display textures 18, 19, and 23 only on the first display 10. Display manager 26 may also determine to present at least one of display textures 18, 19, and 23 only on the second display 12. As such, applications 20 may be unaware of how the display textures are presented on the first display 10 and the second display 12.

In an implementation, referring more specifically to FIG. 2, the first display 10 may be associated with a first plane 11 that presents a display texture, or portions thereof, of the image 101, and a second plane 25 that presents a display texture, or portions thereof, of the image 101. The second display 12 may be associated with a third plane 13 that presents a corresponding display texture, or portions thereof, of the image 101, and fourth plane 27 that presents a display texture, or portions thereof, of the image 101. As such, display manager 26 may determine that the first plane 11 associated with the first display 10 may include a first portion 14 of a first display texture 18, e.g., a left portion of an overlay image, and a second plane 25 associated with the first display 10 may include a first portion 15 of a second display texture 19, e.g., a left portion of a background image. In addition, display manager 26 may determine that the third plane 13 associated with the second display 12 may include a second portion 16 of the first display texture 18, e.g., a right portion of the overlay image, and a fourth plane 27 associated with the second display 12 may include a second portion 17 of the second display texture 19, e.g., a right portion of a background image.

Display manager 26 may include a single buffer 34 that may include a series of sets of textures corresponding to a series of image frames 33 corresponding to different image frames at different times or different images in a sequence. For example, the single buffer 34 may include an array of image data (at each time/sequence) for each of a plurality of image frames 33 up to r image frames 33 (where r is an integer). The single buffer 34 may be shared by each of the plurality of displays, e.g., the first display 10 and the second display 12.

Each image frame 33 may include different sets of data corresponding to each of the multiple displays. For example, in the case of the first display 10 and the second display 12, each image frame may include first image frame data 39 associated with the first display 10 and second image frame data 41 associated with the second display 12. For example, the first image frame data 39 may include the corresponding display textures 18, 19, or portions thereof, for the part of image 101 that is to be displayed on the first display 10. In addition, in some cases, the first image frame data 39 may include a first display identification (ID) 35 to indicate that the first image frame data 39 may correspond to the first display 10 and/or may be presented on the first display 10. In an implementation, the first image frame data 39 may also identify when one or more planes (e.g., first plane 11 and second plane 25) may be associated with the first display 10 and/or when a portion of the display textures (e.g., a first portion 14 of a first display texture 18) may be associated with a particular plane.

Similarly, the second image frame data 41 may include the corresponding display textures 18, 19 or portions thereof for the part of image 101 to be displayed on the second display 12. The second image frame data 41 may also correspond to or be associated with a second display ID 37 that indicates that the second image frame data 41 corresponds to the second display 12 and/or may be presented on the second display 12. In an implementation, the second image frame data 41 may also identify when one or more planes (e.g., third plane 13 and fourth plane 27) is associated with the second display 12 and/or when a portion of the display textures (e.g., a second portion 16 of the first display texture 18) are associated with a particular plane. As such, the single buffer 34 may include all the display textures to be displayed on both the first display 10 and the second display 12 for each of a plurality of image frames 33.

In an implementation, the single buffer 34 may include or be in a form of a swap chain that defines a series of images corresponding to each image frame 33 at different times or corresponding to different ones of a sequence for each of the identified displays 29. As a respective image frame 33 is scanned out from the single buffer 34 for presentation on the identified displays 29, a next one of the plurality or sequence of image frames 33 in the single buffer 34 may be being rendered. Image data may be added to the single buffer 34 when the current image frames 33 in the single buffer 34 are rendered and/or scanned out so that the series of images may be continuously updated with the image data to present on the identified displays 29.

Display manager 26 may generate and/or initiate an atomic present request 32 to initiate presentation of a respective image frame 33 on the first display 10 and the second display 12 in a synchronized manner. The atomic present request 32 may identify the display textures 18, 19 corresponding to the image frame 33 for each of the multiple displays. In an implementation, such as relating to the first display 10 and the second display 12, the atomic present request 32 may more specifically identify a bundled set of the first image frame data 39 for the first display 10 and the second image frame data 41 for the first display 10 from the single buffer 34 to transmit to the display driver 36 for presentation on the first display 10 and the second display 12.

By creating an atomic present 32 using the corresponding image frame data for each display from the single buffer 34 shared by both the first display 10 and the second display 12, the display textures 18, 19 for image 101 may be presented at the same time, e.g., in synchronization, on the first display 10 and the second display 12.

Display manager 26 may transmit the atomic present request 32 to runtime manager 24. Runtime manager 24 may transmit the atomic present request 32, along with the identified bundled set of the first image frame data 39 and the second image frame data 41 to display driver 36. In response, the display driver 36 may present the first image frame data 39 on the first display 10 and may present the second image frame data 41 on the second display 12. While the display manager 26 is initiating presentation of one image frame 33, a next image frame 33 may be being rendered into the single buffer 34, such that the display manager 26 may initiate a next atomic present request for the next image frame at an appropriate time. Thus, the display manager 26 may coordinate the sequential presentation of a plurality of image frames 33 with one or more display textures for presentation on corresponding ones of multiple displays.

As such, a combination of display textures may be presented in a synchronized manner across multiple displays. Moreover, temporal misalignments between display textures presented on, for example, the first display 10 and the second display 12, may be eliminated by presenting the display textures in a synchronized manner across the multiple displays.

One example use case may include presenting a display texture, or portions thereof, of the image 101 across three displays. The first display 10 may be associated with a first plane 11 that presents a display texture, or portions thereof, of the image 101. The second display 12 may be associated with a third plane 13 that presents a corresponding display texture, or portions thereof, of the image 101. The third display may be associated with a fifth plane that presents a display texture, or portions thereof, of the image 101. Display manager 26 may include a single buffer 34 that may include a series of sets of textures corresponding to a series of image frames 33 corresponding to different image frames at different times or different images in a sequence. The single buffer 34 may be shared by each of the plurality of displays, e.g., the first display 10, the second display 12, and the third display. Display manager 26 may generate and/or initiate an atomic present request 32 to initiate presentation of a respective image frame 33 on the first display 10, the second display 12, and the third display in a synchronized manner. As such, a combination of display textures may be presented in a synchronized manner across the three displays.

Figure 3:
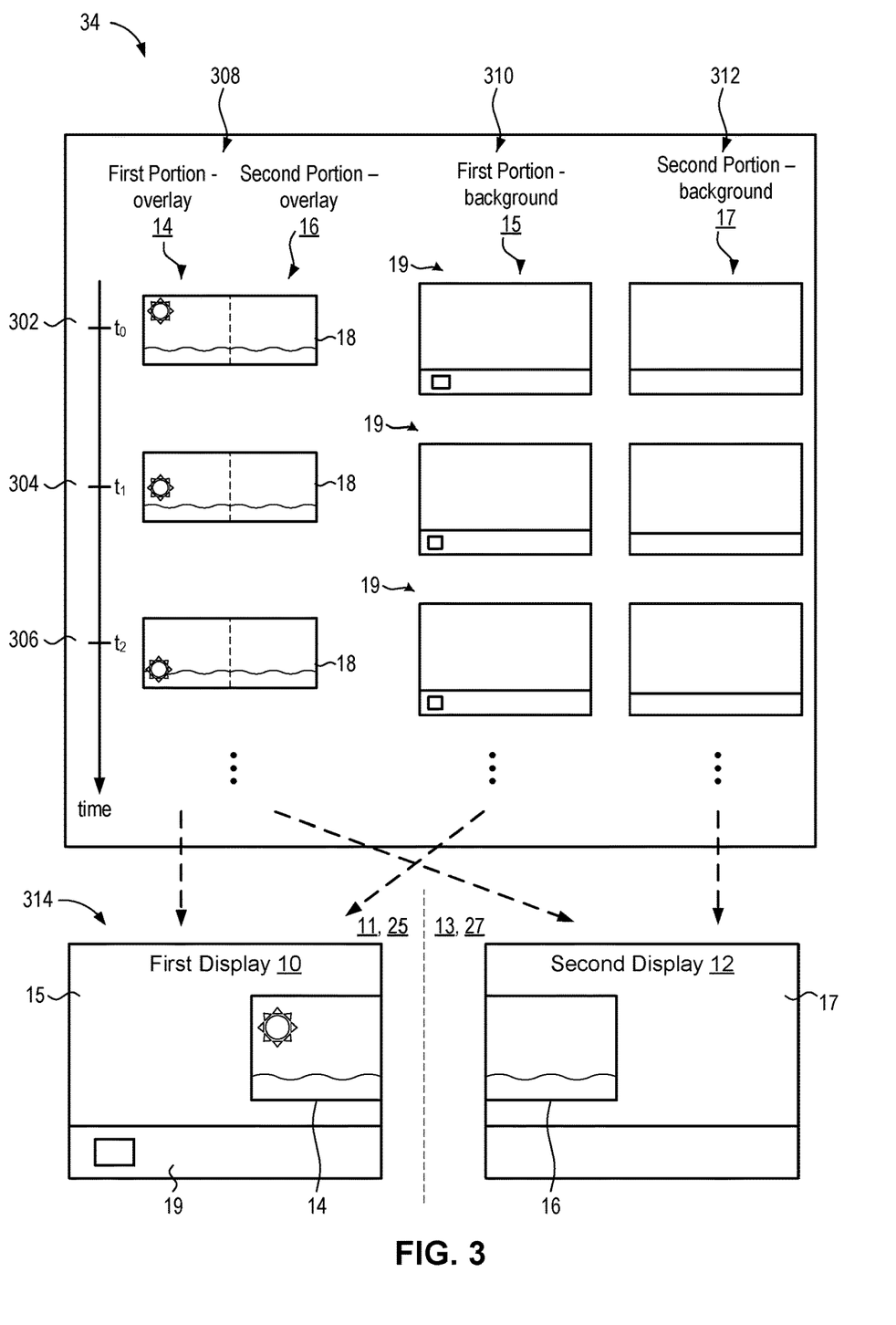
FIG. 3 is an example single buffer with display textures for presentation on two displays in accordance with an implementation of the present disclosure.

Referring now to FIG. 3, single buffer 34 for the display textures presented in the example in FIG. 2 may include a swap chain that defines a series of images corresponding to a layer of each image frame 33 at different times or corresponding to a different one of sequence 302, 304, and 306. For example in this case, the single buffer 34 includes an array of three sets of image data or textures (at each time/sequence), including overlay image data 308 (which may be logically or physically divided into a first portion of overlay data for the first plane 11 and a second portion of overlay data for the third plane 13), second plane background image data 310, and fourth plane background image data 312. It should be understood that different logical or physical divisions may be made between portions of textures and display planes.

Additionally, for example, as illustrated at 314 (corresponding to time (to) 302 or to an initial image of a sequence), the respective first plane 11, second plane 25, third plane 13, and fourth plane 27 of image data 308, 310, and 312 (or textures) at a given time/sequence 302, 304, and 306 may be synchronized and scanned out together to each of the first display 10 and the second display 12.

Overlay image data 308 may include the first portion 14 of display texture 18 for the first plane 11 associated with the first display 10 and the second portion 16 for the third plane 13 associated with the second display 12. For example, the display texture 18 may be divided in half where the left half is displayed on the first display 10 and the right half is displayed on the second display 12. As such, the video of the sunset may be presented on both the first display 10 and the second display 12 at the same time in a synchronized manner. Each image frame 33 at different times or at a different sequence 302, 304, and 306 of overlay image data 308 may indicate the changes in the video data at a given time/sequence. For example, as illustrated at 304 (corresponding to time ($t_1$) 304), the sun may be lower in the sky and at 306 (corresponding to time ($t_2$) 306), the sun may be on the horizon as defined by the ocean.

Overlay image data 310 may include the first portion 15 of the second display texture 19 for the second plane 25 associated with the first display 10. For example, the first portion 15 of the second display texture 19 may be a left portion of a background image that includes an icon on a taskbar. The second display texture 19 may not change as the video is changing (e.g., display texture 18 is changing). As such, overlay image data 310 may not change in each image frame at different times or at a different sequence 302, 304, and 306 for the first portion 15 of the second display texture 19.

Overlay image data 312 may include the second portion 17 of the second display texture 19 for the fourth plane 27 associated with the second display 12. For example, the second portion 17 of the second display texture 19 may be a background image that includes a right portion of the background image. The second display texture 19 may not change as the video is changing (e.g., display texture 18 is changing). As such, overlay image data 312 may not change in each image frame at different times or at a different sequence 302, 304, and 306 for the second portion 17 of the second display texture 19.

As such, a combination of display textures may be presented using a combination of planes in a synchronized manner across multiple displays using the single buffer 34.

Figure 4:
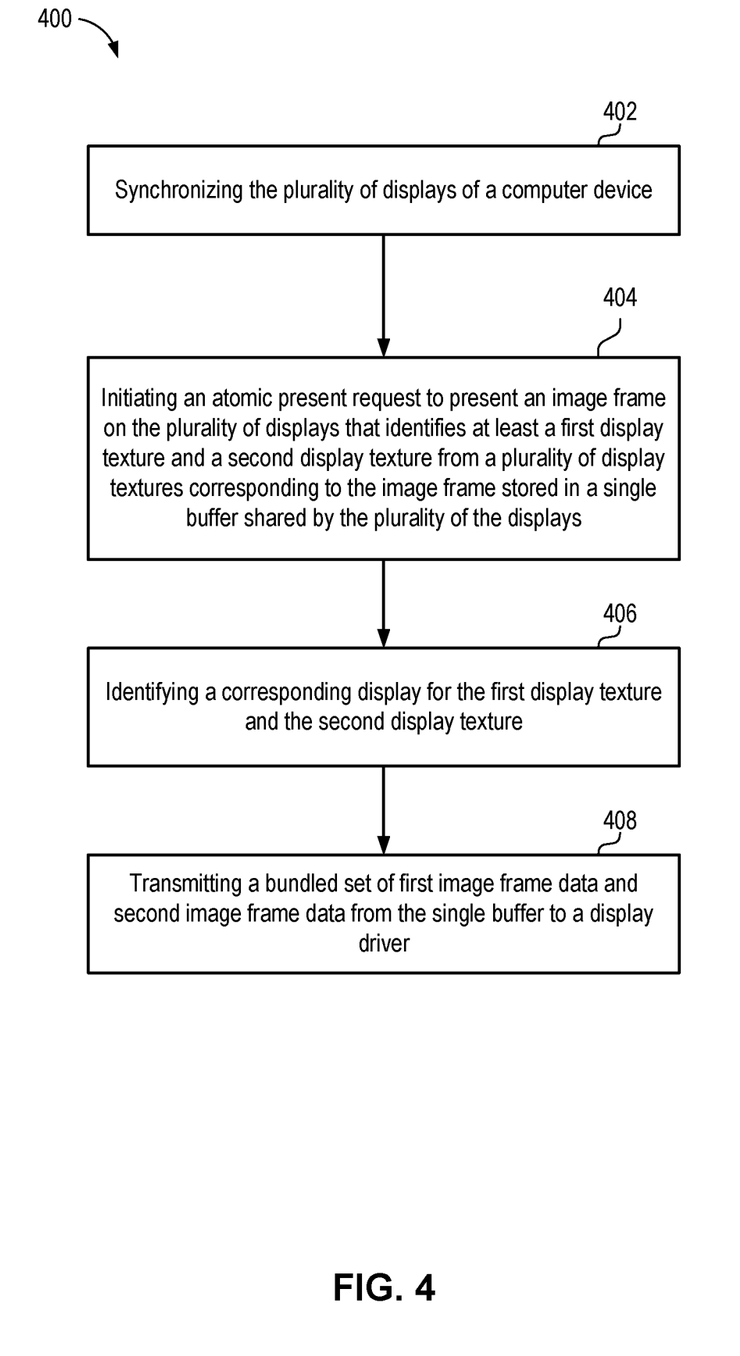
FIG. 4 is an example method flow for presenting an image in an atomic manner from a single buffer across a plurality of displays in accordance with an implementation of the present disclosure.

Referring now to FIG. 4, an example method may be used by computer device 102 (FIG. 1) for presenting an image 101 (FIG. 1) in an atomic manner from a single buffer 34 across multiple displays in communication with computer device 102 so that the image 101 may be presented in a synchronized manner across the multiple displays. The actions of method 400 may be discussed below with reference to the architecture of FIG. 1.

At 402, method 400 may include synchronizing the plurality of displays of the computer device. Computer device 102 may include and/or may be in communication with a plurality of displays up to n displays (where n is an integer). Computer device 102 may include a display manager 26 that may include a display identifier 28 that identifies a number of displays 29 in communication with computer device 102. For example, the identified displays 29 may include two displays, the first display 10 and the second display 12, in communication with computer device 102.

Display identifier 28 may also indicate and/or control whether the identified displays 29 may be synchronized. Displays may be synchronized, for example, when the displays have the same resolutions and the same timing. When the identified displays 29 may be synchronized, display manager 26 may send a display synchronization request 30 to synchronize the signals and/or the timing of the identified displays 29.

At 404, method 400 may include initiating an atomic present request to present an image frame on the plurality of displays. An atomic present across multiple displays may allow for all the effects of the image to be observed in a single frame, whereas a non-atomic present some effects may be observed in one frame while others may be observed in the following frame. As such, when presenting in an atomic manner, either all the effects are observed in a frame or all the effects are deferred to the following frame.

The atomic present request may identify at least a first display texture and a second display texture from a plurality of display textures corresponding to the image frame stored in a single buffer shared by the plurality of the displays for synchronized presentation. Display manager 26 may include a single buffer 34 that may include a series of images corresponding to each image frame 33 at different times or a corresponding to different ones of a sequence. For example, the single buffer 34 may include an array of image data (at each time/sequence) for each time frame 33 up to r image frames 33 (where r is an integer). The single buffer 34 may be shared by the first display 10 and the second display 12.

Each image frame 33 may include first image frame data 39 and second image frame data 41 associated with the image frames 33. For example, the first image frame data 39 may include portions of the corresponding display textures 18, 19 for image 101 to be presented on the first display 10. In addition, the first image frame data 39 may be associated with a first display identification (ID) 35 to indicate that the first image frame data 39 is intended for the first display 10 and/or may be presented on the first display 10. In an implementation, the first image frame data 39 may also identify when one or more planes (e.g., first plane 11 and second plane 25) may be associated with the first display 10 and/or when a portion of the display textures (e.g., a first portion 14 of a first display texture 18) may be associated with a display plane.

The second image frame data 41 may include the corresponding portions of the display textures 18, 19 for image 101 to be presented on the second display 12. The second image frame data 41 may also be associated with a second display ID 37 to indicate that the second image frame data 41 are intended for the second display 12 and/or may be presented on the second display 12. In an implementation, the second image frame data 41 may also identify when one or more planes (e.g., third plane 13 and fourth plane 27) is associated with the second display 12 and/or when a portion of the display textures (e.g., a second portion 16 of the first display texture 18) may be associated with a display plane. As such, the single buffer 34 may include all the display textures to be displayed on both the first display 10 and the second display 12 for the image frames 33.

In an implementation, the single buffer 34 may include a swap chain that defines a series of images corresponding to each image frame 33 at different times or at a different sequence for each of the identified displays 29. As an image frame 33 is scanned out from the single buffer 34 for presentation on the identified displays 29, a next image frame 33 in the single buffer 34 may be rendering. Image data may be added to the single buffer 34 when the current image frames 33 in the single buffer 34 are rendered and/or scanned out so that the series of images may be continuously updated with the image data to present on the identified displays 29.

Display manager 26 may generate and/or initiate an atomic present request 32 to present different portions of the image frame 33 on the plurality of displays so that the image frame 33 representing image 101 may be presented in a synchronized manner across the plurality of displays. For example, the an atomic present request 32 to present different portions of the image frame 33 on the first display 10 and the second display 12 so that the image frame 33 representing image 101 may be presented in a synchronized manner across the first display 10 and the second display 12.

At 406, method 400 may include identifying a corresponding display for the first display texture and the second display texture. The atomic present request 32 may also identify that the display textures 18, 19 corresponding to the image frame 33, and that which textures or portions of textures are associated with which displays, e.g., based on the corresponding display IDs or based on corresponding display planes associated with the textures. For example, the atomic present request 32 may identify that the first display texture corresponds to the first display 10 and the second display texture corresponds to the second display 12.

At 408, method 400 may include transmitting a bundled set of first image frame data and second image frame data from the single buffer to a display driver. The atomic present request 32 may also identify a bundled set of the first image frame data 39 and the second image frame data 41 from the single buffer 34 to transmit to the display driver 36 for respective presentation on the plurality of displays. For example, the bundled set of first image frame data 39 and the second image frame data 41 may be presented on the first display 10 and the second display 12. The first image frame data may include the one or more display textures corresponding to the first display and the second image frame data may include the one or more display textures corresponding to the second display.

Display manager 26 may transmit the atomic present request 32 to runtime manager 24. Runtime manager 24 may transmit the atomic present request 32, along with the identified bundled set of the first image frame data 39 and the second image frame data 41 to display driver 36. Display driver 36 may present the first image frame data 39 on the first display 10 and may present the second image frame data 41 on the second display 12

As such, a combination of display textures may be presented in a synchronized manner across multiple displays. Moreover, temporal misalignments between display textures presented on the first display and the second display may be eliminated by presenting the display textures in a synchronized manner across the multiple displays.

Figure 5:
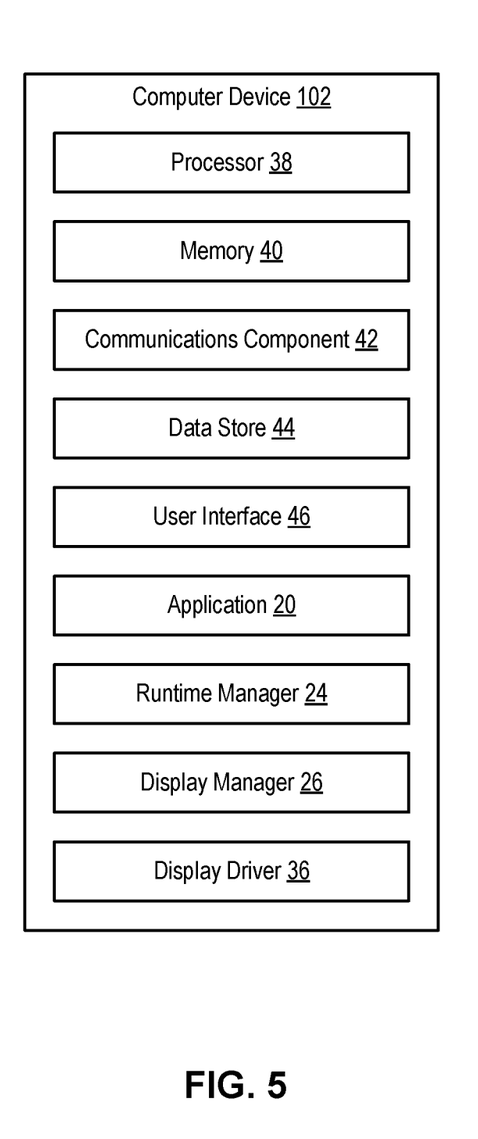
FIG. 5 is a schematic block diagram of an example device in accordance with an implementation of the present disclosure.

Referring now to FIG. 5, illustrated is an example computer device 102 in accordance with an implementation, including additional component details as compared to FIG. 1. In one example, computer device 102 may include processor 38 for carrying out processing functions associated with one or more of components and functions described herein. Processor 38 can include a single or multiple set of processors or multi-core processors. Moreover, processor 38 can be implemented as an integrated processing system and/or a distributed processing system.

Computer device 102 may further include memory 40, such as for storing local versions of applications being executed by processor 38. Memory 40 can include a type of memory usable by a computer, such as random access memory (RAM), read only memory (ROM), tapes, magnetic discs, optical discs, volatile memory, non-volatile memory, and any combination thereof. Additionally, processor 38 and memory 40 may include and execute operating system 110 (FIG. 1).

Further, computer device 102 may include a communications component 42 that provides for establishing and maintaining communications with one or more parties utilizing hardware, software, and services as described herein. Communications component 42 may carry communications between components on computer device 102, as well as between computer device 102 and external devices, such as devices located across a communications network and/or devices serially or locally connected to computer device 102. For example, communications component 42 may include one or more buses, and may further include transmit chain components and receive chain components associated with a transmitter and receiver, respectively, operable for interfacing with external devices.

Additionally, computer device 102 may include a data store 44, which can be any suitable combination of hardware and/or software, that provides for mass storage of information, databases, and programs employed in connection with implementations described herein. For example, data store 44 may be a data repository for applications 20 (FIG. 1), runtime manager 24 (FIG. 1), display manager 26 (FIG. 1), and/or display driver 36 (FIG. 1).

Computer device 102 may also include a user interface component 46 operable to receive inputs from a user of computer device 102 and further operable to generate outputs for presentation to the user. User interface component 46 may include one or more input devices, including but not limited to a keyboard, a number pad, a mouse, a touch-sensitive display, a navigation key, a function key, a microphone, a voice recognition component, any other mechanism capable of receiving an input from a user, or any combination thereof. Further, user interface component 46 may include one or more output devices, including but not limited to a display, a speaker, a haptic feedback mechanism, a printer, any other mechanism capable of presenting an output to a user, or any combination thereof.

In an implementation, user interface component 46 may transmit and/or receive messages corresponding to the operation of applications 20, runtime manager 24, display manager 26, and/or display driver 36. In addition, processor 38 executes applications 20, runtime manager 24, display manager 26, and/or display driver 36, and memory 40 or data store 48 may store them.

As used in this application, the terms "component," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computer device and the computer device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various implementations or features may have been presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches may also be used.

The various illustrative logics, logical blocks, and actions of methods described in connection with the embodiments disclosed herein may be implemented or performed with a specially-programmed one of a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of computer devices, e.g., a combination of a DSP and a microprocessor, a plurality of microprocessors, one or more microprocessors in conjunction with a DSP core, or any other such configuration. Additionally, at least one processor may comprise one or more components operable to perform one or more of the steps and/or actions described above.

Further, the steps and/or actions of a method or algorithm described in connection with the implementations disclosed herein may be embodied directly in hardware, in a software module executed by a processor, or in a combination of the two. A software module may reside in RAM memory, flash memory, ROM memory, EPROM memory, EEPROM memory, registers, a hard disk, a removable disk, a CD-ROM, or any other form of storage medium known in the art. An exemplary storage medium may be coupled to the processor, such that the processor can read information from, and write information to, the storage medium. In the alternative, the storage medium may be integral to the processor. Further, in some implementations, the processor and the storage medium may reside in an ASIC. Additionally, the ASIC may reside in a user terminal. In the alternative, the processor and the storage medium may reside as discrete components in a user terminal. Additionally, in some implementations, the steps and/or actions of a method or algorithm may reside as one or any combination or set of codes and/or instructions on a machine readable medium and/or computer readable medium, which may be incorporated into a computer program product.

In one or more implementations, the functions described may be implemented in hardware, software, firmware, or any combination thereof. If implemented in software, the functions may be stored or transmitted as one or more instructions or code on a computer-readable medium. Computer-readable media includes both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs usually reproduce data optically with lasers. Combinations of the above should also be included within the scope of computer-readable media.

While implementations of the present disclosure have been described in connection with examples thereof, it will be understood by those skilled in the art that variations and modifications of the implementations described above may be made without departing from the scope hereof. Other implementations will be apparent to those skilled in the art from a consideration of the specification or from a practice in accordance with examples disclosed herein.

What is claimed is:

1. A computer device, comprising:
a plurality of displays;
a memory to store data and instructions, wherein the memory stores a single buffer shared by the plurality of displays with a plurality of display textures corresponding to an image frame to present on the plurality of displays;
a processor in communication with the memory;
an operating system in communication with the memory and the processor, wherein the operating system is operable to:
synchronize the plurality of displays of the computer device;
initiate an atomic present request to present the image frame on the plurality of displays including at least a first display and a second display, the atomic present request identifying at least a first display texture and a second display texture from the plurality of display textures corresponding to the image frame and that the first display texture corresponds to the first display and the second display texture corresponds to the second display; and
transmit a bundled set of first image frame data and second image frame data from the single buffer to a display driver to present the bundled set of first image frame data and the second image frame data at a same time on the first display and the second display to synchronize the first display texture and the second display texture across the first display and the second display, wherein the first image frame data comprises the first display texture corresponding to the first display, and wherein the second image frame data comprises the second display texture corresponding to the second display.

2. The computer device of claim 1, wherein the first display texture comprises a first portion of a display texture and the second display texture comprises a corresponding second portion of the display texture.

3. The computer device of claim 1, wherein the operating system is further operable to:
determine a first plane associated with the first display and a second plane associated with the second display; and
identify the first display texture as corresponding to the first plane and the second display texture as corresponding to the second plane.

4. The computer device of claim 3, wherein the first display texture comprises a plurality of first image frame data and the second display texture comprises a plurality of second image frame data, wherein each of the plurality of second image frame data corresponds to one of the plurality of first image frame data.

5. The computer device of claim 1, wherein the operating system is further operable to create the atomic present request to trigger simultaneously presenting the image frame on the first display and the second display.

6. The computer device of claim 1, wherein to synchronize the plurality of the displays further includes to synchronize the signaling to the plurality of the displays.

7. The computer device of claim 1, wherein the single buffer comprises a swap chain that defines a series of images corresponding to the image frame at different times.

8. The computer device of claim 1, wherein the plurality of displays further includes a third display.

9. The computer device of claim 8, wherein the plurality of display textures further includes a third display texture and the atomic present request further identifies that the third display texture corresponds to the third display, and
wherein the operating system is further operable to transmit third image frame data that comprises the third display texture corresponding to the third display to the display driver.

10. The computer device of claim 1, wherein the plurality of display textures are received from a plurality of applications and the image frame comprises a layering or composition of the plurality of display textures.

11. A computer device of claim 1, wherein the operating system is further operable to:

switch between presenting a single buffer for the first display and the second display and presenting individual buffers for each of the first display and the second display.

12. A computer device of claim 1, wherein the operating system is further operable to initiate the atomic present request to present a combination of the plurality of display textures in synchronization across the first display and the second display.

13. A method for presenting an image in an atomic manner across a plurality of displays of a computer device from a single buffer shared by the plurality of displays, comprising:
synchronizing, at an operating system executing on the computer device, the plurality of displays of the computer device;
initiating an atomic present request to present an image frame on the plurality of displays including at least a first display and a second display, the atomic present request identifying at least a first display texture and a second display texture from a plurality of display textures stored in the single buffer corresponding to the image frame and that the first display texture corresponds to the first display and the second display texture corresponds to the second display; and
transmitting a bundled set of first image frame data and second image frame data from the single buffer to a display driver to present the bundled set of first image frame data and the second image frame data at a same time on the first display and the second display to synchronize the first display texture and the second display texture across the first display and the second display, wherein the first image frame data comprises the first display texture corresponding to the first display, and wherein the second image frame data comprises the second display texture corresponding to the second display.

14. The method of claim 13, wherein the first display texture comprises a first portion of a display texture and the second display texture comprises a corresponding second portion of the display texture.

15. The method of claim 13, further comprising:
determine a first plane associated with the first display and a second plane associated with the second display; and
identify the first display texture as corresponding to the first plane and the second display texture as corresponding to the second plane.

16. The method of claim 15, wherein the first display texture comprises a plurality of first image frame data and the second display texture comprises a plurality of second image frame data, wherein each of the plurality of second image frame data corresponds to one of the plurality of first image frame data.

17. The method of claim 13, further comprising creating the atomic present request to trigger simultaneously presenting the image frame on the first display and the second display.

18. The method of claim 13, wherein synchronizing the plurality of displays further includes synchronizing the signaling to the plurality of displays.

19. The method of claim 13, wherein the single buffer comprises a swap chain that defines a series of images corresponding to a plurality of image frames at different times.

20. The method of claim 13, wherein the plurality of displays further includes a third display.

21. The method of claim 20, wherein the plurality of display textures further includes a third display texture and the atomic present request further identifies that the third display texture corresponds to the third display, and
the method further comprising:
transmitting third image frame data that comprises the third display texture corresponding to the third display to the display driver.

22. A non-transitory computer-readable medium storing instructions executable by a computer device, comprising:
at least one instruction for causing the computer device to synchronize a plurality of displays of the computer device;
at least one instruction for causing the computer device to initiate an atomic present request to present an image frame on the plurality of displays including at least a first display and a second display, the atomic present request identifying at least a first display texture and a second display texture from a plurality of display textures stored in a single buffer shared by the plurality of displays corresponding to the image frame and that the first display texture corresponds to the first display and the second display texture corresponds to the second display; and
at least one instruction for causing the computer device to transmit a bundled set of first image frame data and second image frame data from the single buffer to a display driver to present the bundled set of first image frame data and the second image frame data at a same time on the first display and the second display to synchronize the first display texture and the second display texture across the first display and the second display, wherein the first image frame data comprises the first display texture corresponding to the first display, and wherein the second image frame data comprises the second display texture corresponding to the second display.

* * * * *